US012606198B2

(12) United States Patent
Li et al.

(10) Patent No.:  US 12,606,198 B2
(45) Date of Patent:  Apr. 21, 2026

(54) POSITIONING METHOD AND SYSTEM FOR AUTONOMOUS DRIVING THROUGH LONG SHORT-TERM MEMORY (LSTM)-BASED DEEP REINFORCEMENT LEARNING (DRL)

(71) Applicant: GUANGDONG UNIVERSITY OF TECHNOLOGY, Guangzhou (CN)

(72) Inventors: Zhenni Li, Guangzhou (CN); Shengli Xie, Guangzhou (CN); Kan Xie, Guangzhou (CN); Ci Chen, Guangzhou (CN); Victor Fedorovich Kuzin, Guangzhou (CN); Haoli Zhao, Guangzhou (CN); Bo Li, Guangzhou (CN)

(73) Assignee: Guangdong University of Technology, Guangzhou (CN)

( * ) Notice: Subject to any disclaimer, the term of this patent is extended or adjusted under 35 U.S.C. 154(b) by 371 days.

(21) Appl. No.: 18/315,753

(22) Filed: May 11, 2023

(65) Prior Publication Data

US 2024/0174257 A1 May 30, 2024

(30) Foreign Application Priority Data

Nov. 29, 2022 (CN) .......................... 202211504017.1

(51) Int. Cl.
*B60W 60/00* (2020.01)
*G01S 19/07* (2010.01)
(Continued)

(52) U.S. Cl.
CPC ......... *B60W 60/001* (2020.02); *G01S 19/071* (2019.08); *G06N 3/0442* (2023.01); *G06N 7/01* (2023.01); *B60W 2556/50* (2020.02)

(58) Field of Classification Search
CPC ............. B60W 60/001; B60W 2556/50; G01S 19/071; G01S 19/40; G01S 19/44;
(Continued)

(56) References Cited

U.S. PATENT DOCUMENTS

2017/0193360 A1\* 7/2017 Gao .......................... G06N 3/08
2018/0364366 A1\* 12/2018 Cvijetic .................. G01S 19/47
(Continued)

OTHER PUBLICATIONS

Kai Zhu and Tao Zhang, Deep Reinforcement Learning Based Mobile Robot Navigation: A Review, Oct. 2021, vol. 26, No. 5 (Year: 2021).\*

*Primary Examiner* — Anne Marie Antonucci
*Assistant Examiner* — Luis G Del Valle
(74) *Attorney, Agent, or Firm* — Heslin Rothenberg Farley and Mesiti P.C.; Victor A. Cardona, Esq.

(57) ABSTRACT

The present disclosure provides a positioning method and system for autonomous driving through Long Short-Term Memory (LSTM)-based Deep Reinforcement Learning (DRL). The method includes: performing normalization preprocessing on a complex environment of autonomous driving based on a Partially Observable Markov Decision Process (POMDP), to acquire a real-time kinematic (RTK) positioning result; inputting the RTK positioning result into an LSTM-based DRL model for correction to acquire an evaluated value of a position correction action; and performing position correction on an autonomous vehicle based on the evaluated value of the position correction action. The system includes a prediction module, a correction module, and an application module. The present disclosure considers that autonomous driving is highly dynamic, temporal, and complex in a complex environment, and generates a more accurate satellite positioning position. The present disclosure can be widely used in the technical field of satellite positioning for autonomous driving.

9 Claims, 3 Drawing Sheets

Perform normalization preprocessing on a complex environment of autonomous driving based on a POMDP, to acquire an RTK positioning result Input the RTK positioning result into an LSTM-based DRL model for correction to acquire a position correction value Perform position correction on an autonomous vehicle based on the position correction value

(51) Int. Cl.
*G06N 3/0442* (2023.01)
*G06N 7/01* (2023.01)

(58) Field of Classification Search
CPC ........ G06N 3/0442; G06N 7/01; G06N 3/006;
G06N 3/044; G06N 3/045; G06N 3/08;
Y02T 10/40
See application file for complete search history.

(56) References Cited

U.S. PATENT DOCUMENTS

2021/0256371 A1\* 8/2021 Ariki ...................... G01C 21/34
2022/0277572 A1\* 9/2022 Fang ..................... G06T 7/0012
2025/0014161 A1\* 1/2025 Rakha ................. G06V 20/176

\* cited by examiner

DRL-based dynamic anti-jamming positioning correction model

POSITIONING METHOD AND SYSTEM FOR AUTONOMOUS DRIVING THROUGH LONG SHORT-TERM MEMORY (LSTM)-BASED DEEP REINFORCEMENT LEARNING (DRL)

CROSS REFERENCE TO RELATED APPLICATION

This patent application claims the benefit and priority of Chinese Patent Application No. 202211504017.1 filed on Nov. 29, 2022, the disclosure of which is incorporated by reference herein in its entirety as part of the present application.

TECHNICAL FIELD

The present disclosure relates to the technical field of satellite positioning for autonomous driving, and in particular to a positioning method and system for autonomous driving through Long Short-Term Memory (LSTM)-based Deep Reinforcement Learning (DRL).

BACKGROUND

Autonomous driving, a new technology emerging in the context of a new round of scientific and technological revolution, represents the strategic high ground of future automotive technology. Satellite positioning technology is a technology to determine the exact position of a vehicle, and is the premise and basis for realizing the navigation function for autonomous driving. The satellite positioning technology provides the autonomous vehicle with absolute position information, and has high absolute positioning accuracy to make the vehicle accurately perceive its position. The satellite positioning technology can improve the search efficiency of map matching, and can also provide a certain backup function when the sensor is blocked. Therefore, accurate satellite navigation and positioning is an essential key technology for autonomous driving. However, the positioning accuracy of the Global Navigation Satellite System (GNSS) is affected by various environmental factors, such as buildings and trees. In the dynamic scene of autonomous driving, due to the rapid changes in the surrounding environment of the vehicle, the satellite signals received by the positioning device are affected by dynamic changes and interferences, resulting in inaccurate positioning. In the existing research and technology, some methods are based on hardware such as auxiliary equipment and infrastructure to improve the positioning accuracy, and some methods are based on software to improve the positioning accuracy. Some software-based methods use muti-GNSS models (Global Positioning System (GPS), Beidou, and Globalnaya Navigazionnaya Sputnikovaya Sistema (GLONASS)) to combine the acquired information for mutual correction, so as to improve the positioning accuracy of smartphones. In addition, some software-based methods improve the GPS positioning accuracy through sensor fusion technology. For example, an adaptive Kalman filter model is constructed to adapt to the dynamic driving environment. However, it depends on strict assumptions about GPS observation noise and motion model. Some scholars have proposed a positioning correction model based on the Deep Neural Network (DNN), which converts the position estimation problem solved by the traditional GNSS positioning algorithm into the problem of initial position correction estimation, and uses the DNN to learn the function mapping from GNSS measurement to position correction. However, this method is a static learning method. It does not consider the correlation of historical data, and only depends on the initial position information for correction, so it is not suitable for dynamic positioning correction for autonomous driving in the complex urban environment. Overall, the proposed model cannot adapt to the dynamic environment and depends on strict prior assumptions about the sensor or model parameters. In dynamic driving, due to the rapid change of the surrounding environment of the vehicle, reference station deployment and map matching for the purpose of improving the positioning accuracy of the vehicle are costly and hard to promote.

SUMMARY

In order to solve the above technical problems, an objective of the present disclosure is to provide a positioning method and system for autonomous driving through Long Short-Term Memory (LSTM)-based Deep Reinforcement Learning (DRL). The present disclosure considers that autonomous driving is highly dynamic, temporal, and complex in a complex environment, and generates a more accurate satellite positioning position.

A first technical solution adopted by the present disclosure is as follows: the positioning method for autonomous driving through LSTM-based DRL includes the following steps:

performing normalization preprocessing on a complex environment of autonomous driving based on a Partially Observable Markov Decision Process (POMDP), to acquire a Real-Time Kinematic (RTK) positioning result;

inputting the RTK positioning result into a LSTM-based DRL model for correction to acquire an evaluated value of a position correction action; and performing position correction on an autonomous vehicle based on the evaluated value of the position correction action.

Further, performing normalization preprocessing on the complex environment of autonomous driving based on the POMDP, to acquire the Real-Time Kinematic (RTK) positioning result specifically includes:

acquiring, by an RTK positioning technology, complex environment information of autonomous driving and agent positioning information;

modeling the complex environment of autonomous driving based on the POMDP to acquire an environment model;

representing, by the environment model, the complex environment information of autonomous driving and the agent positioning information to acquire a corresponding belief state distribution;

solving, by a POMDP programming method, the corresponding belief state distribution to acquire an RTK positioning result.

Further, solving, by the POMDP programming method, the corresponding belief state distribution to acquire the RTK positioning result specifically includes:

defining, by the POMDP programming method, an action space, an observation space, a belief state space, and a reward function;

correcting, by the action space, the agent positioning information to acquire corrected agent positioning information;

predicting, by the observation state space, the agent positioning information to acquire predicted agent positioning information;

replacing, by the belief state space, the agent positioning information with the predicted agent positioning information, and updating the belief state space; and negating, by the reward function, a sum of a square error of a difference between the corrected agent positioning information and the predicted agent positioning information to acquire the RTK positioning result.

Further, a calculation equation for negating the sum of the square error of the difference between the corrected agent positioning information and the predicted agent positioning information is as follows:

$$R_t = r_1 + \eta \sum_{t=2}^{T} \gamma^{t-1} r_t$$

$$r_t = -\sqrt{(x_t - \tilde{x}_t)^2 + (y_t - \tilde{y}_t)^2}$$

where, $\eta$ denotes a reward regularization factor; $r_t$ denotes a negative of a Euclidean distance between corrected position information $(x_t, y_t)$ of the LSTM-based DRL model and map matching position information $(\tilde{x}_t, \tilde{y}_t)$ at a time t; $\gamma^{t-1}$ denotes a reward discount factor; and $R_t$ denotes a cumulative reward at the time t.

Further, inputting the RTK positioning result into the LSTM-based DRL model for correction to acquire the evaluated value of the position correction action specifically includes:

constructing the LSTM-based DRL model, and inputting the RTK positioning result into the LSTM-based DRL model, where the LSTM-based DRL model includes a policy network and a value network;

correcting, by the policy network, the input RTK positioning result according to a preset action magnitude, and outputting a positioning observation result including geographic position information defined by latitude and longitude; and optimizing, by the value network, the positioning observation result including the geographic position information defined by latitude and longitude by minimizing a Temporal Difference (TD) error, to acquire the evaluated value of the position correction action for evaluating a positioning correction policy of the policy network.

Further, correcting, by the policy network, the input RTK positioning result according to the preset action magnitude, and outputting the positioning observation result including the geographic position information defined by latitude and longitude specifically includes:

inputting the RTK positioning result into the policy network including an input layer, an LSTM network layer, a hidden layer, and an output layer;

normalizing, by the input layer, the RTK positioning result to acquire normalized positioning information;

representing, by the LSTM network layer, a correlation and influence between the normalized kinematic positioning information, and outputting temporally changing positioning information to the hidden layer and output layer following the LSTM network layer; and multiplying, by the hidden layer and the output layer, represented positioning information through a sigmoid function and a tanh function, and outputting the positioning observation result including the geographic position information defined by latitude and longitude.

Further, representing, by the LSTM network layer, the correlation and influence between the normalized kinematic positioning information, and outputting the temporally changing positioning information to the hidden layer and output layer following the LSTM network layer specifically includes:

inputting the normalized positioning information into the LSTM network layer including an input gate, a forget gate, and an output gate;

updating, by the input gate, the normalized positioning information to acquire updated positioning information;

removing, by the forget gate, invalid positioning information in the updated positioning information, to acquire valid positioning information; and sequencing, by the output gate, the valid positioning information to acquire the represented positioning information.

Further, a calculation equation of the forget gate is as follows:

$$f_t = \sigma(W_f g[h_{t-1}, x_t] + b_f)$$

where, $W_f$ denotes a weight matrix; $b_f$ denotes a bias; $x_t$ denotes a current network input; g denotes vector merging; $h_{t-1}$ denotes an input of the forget gate; $f_t$ denotes the forget gate; and $\sigma$ denotes an activation function sigmoid.

A calculation equation for minimizing the TD error is expressed as follows:

$$\delta = r_t + \gamma V(e_{t+1}, w) - V(e_t, w)$$

where, $\gamma$ denotes a discount rate; $e_t$ denotes a belief state at the time t; $r_t$ denotes a reward at the time t; V denotes a value function; w denotes a parameter of the value network; and $\delta$ denotes the TD error.

A second technical solution adopted by the present disclosure is as follows: the positioning system for autonomous driving through LSTM-based DRL includes:

a prediction module configured to perform normalization preprocessing on a complex environment of autonomous driving based on a POMDP, to acquire an RTK positioning result;

a correction module configured to input the RTK positioning result into an LSTM-based DRL model for correction to acquire an evaluated value of a position correction action; and an application module configured to perform position correction on an autonomous vehicle based on the evaluated value of the position correction action.

The present disclosure has the following beneficial effects. The present disclosure introduces the POMDP to model the complex environment of autonomous driving and construct an interactive environment for accurate satellite positioning under the complex environment of autonomous driving. The present disclosure takes the previous prediction information of the agent as the belief state, and allows the temporal signal of the belief state of a previous time to determine the next state, and further constructs the LSTM-based DRL model. The present disclosure introduces the LSTM network to extract features from the complex environment of autonomous driving so as to ensure that the model has strong decision-making and perception abilities. In this way, the present disclosure establishes the method and system that can adapt to the highly dynamic environment to realize accurate satellite positioning for autonomous driving in the complex urban environment.

DETAILED DESCRIPTION OF THE EMBODIMENTS

The present disclosure will be further described below in conjunction with the drawings and specific embodiments. The step number in the following embodiments is only for convenience of explanation. The present disclosure does not limit the sequence between steps, and the execution sequence of each step in the embodiment can be adjusted adaptively according to the understanding of those skilled in the art.

Figure 1:
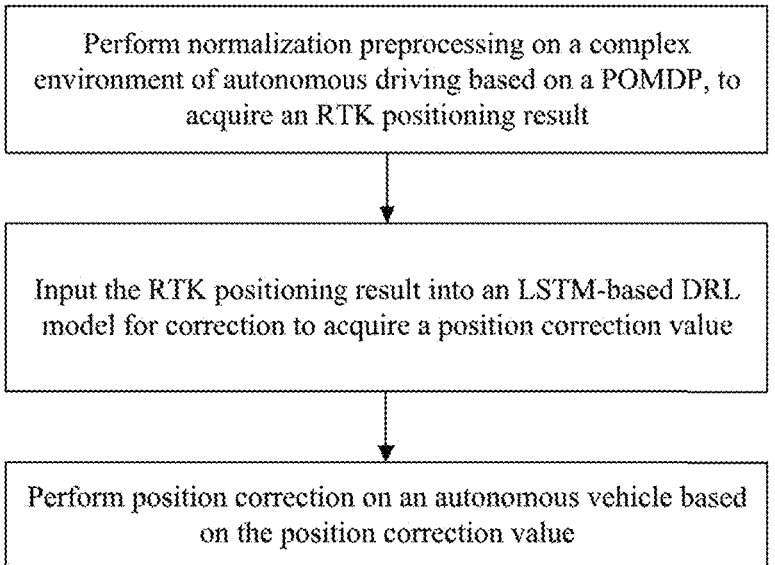
FIG. 1 is a flowchart of a positioning method for autonomous driving through Long Short-Term Memory (LSTM)-based Deep Reinforcement Learning (DRL) according to the present disclosure.

Referring to FIG. 1, the present disclosure provides a positioning method for autonomous driving through Long Short-Term Memory (LSTM)-based deep reinforcement learning (DRL). The method includes the following steps:

S1. An accurate satellite positioning scene is constructed in a complex environment for autonomous driving.

Figure 4:
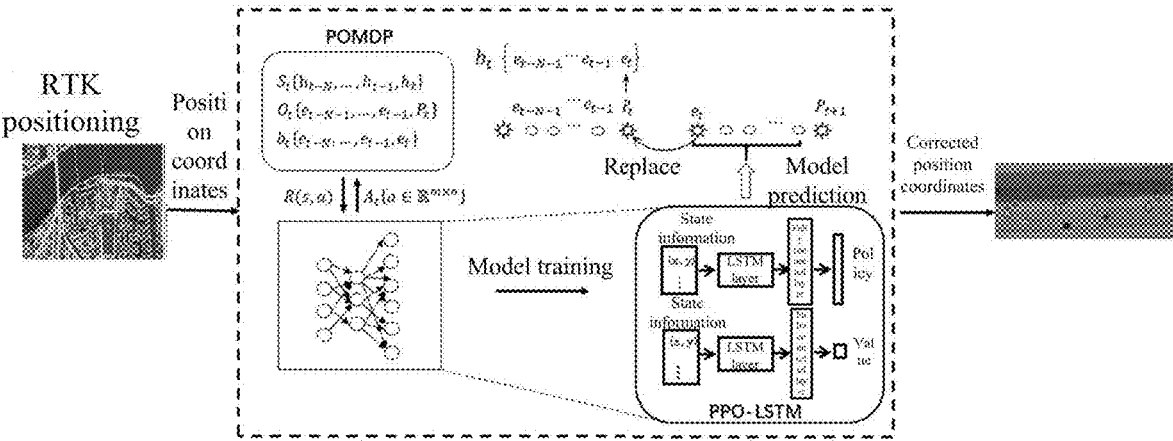
FIG. 4 is a schematic diagram of a training process of the LSTM-based DRL model in a complex environment of autonomous driving according to the present disclosure.

Specifically, referring to FIG. 4, the data used in the present disclosure is from the position data acquired by the satellite receiver of the high-accuracy centimeter-level ZED-F9P RTK positioning module in the Beidou Positioning, Navigation and Timing (PNT) Branch of the Joint Laboratory of Guangdong-Hong Kong-Macao Greater Bay Area. Since the state information observed by an agent at a current time cannot determine the state information at the next time, it does not satisfy the Markov Decision Process (MDP). Therefore, a POMDP is introduced for environment modeling. The previous prediction information of the agent is taken as a belief state to define an action space $A_t$, an observation space $O_t$, a belief state space $b_t$, and a reward function $R(s, a)$.

Action space $A_t\{a_1, a_2, \ldots, a_{m*n}\}$: The control policy of the model needs to output a corresponding positioning correction action, and an object of correction is a positioning result broadcast by a positioning device. Therefore, the action space can be defined as a scalar matrix $\mathbb{R}^{m \times n}$, where m, n denote correction steps in latitude and longitude, respectively. The correction steps are $\{-10, -9, \ldots, 0, \ldots 9, 10\}$, that is, there are $21^2 = 441$ correction steps.

Observation state space $O_t\{e_{t-N-1}, \ldots, e_{t-1}, P_t\}$: N−1 points, with an interval time, of historical prediction correction of the model and a positioning broadcast result $P_n$ define the observation state space.

Belief state space $b_t\{e_{t-N-1}, \ldots, e_t\}$: Compared with observation state space, after the model makes the prediction correction, $P_t$ is replaced with a current prediction correction value $e_t$ to update the belief state space.

Reward function $R(s, a)$: The reward function is defined according to a Euclidean distance between corrected position information of the model and map matching position information, that is, a negative of a sum of a square error of a difference between a corrected position result of the model and a map matching result. In the process of autonomous driving, the positioning results corrected by the model at different times t are temporal, so it is necessary to accumulate positioning rewards of a whole route according to a temporal sequence. A calculation equation for negating the sum of the square error of the difference between corrected agent positioning information and predicted agent positioning information is as follows:

$$R_t = r_1 + \eta \sum_{t=2}^{T} \gamma^{t-1} r_t$$

$$r_t = -\sqrt{(x_t - \tilde{x}_t)^2 + (y_t - \tilde{y}_t)^2}$$

$\eta$ denotes a reward regularization factor; $r_t$ denotes a negative of a Euclidean distance between corrected position information $(x_t, y_t)$ of the LSTM-based DRL model and map matching position information $(\tilde{x}_t, \tilde{y}_t)$ at a time t; the model maximizes the reward function to seek an optimal correction policy; $\gamma^{-1}$ denotes a reward discount factor; and $R_t$ denotes a cumulative reward at the time t.

S2. An LSTM-based DRL model is constructed.

Specifically, considering that autonomous driving is highly dynamic, temporal, and complex in a complex environment, a DRL model that simply uses a fully connected neural network based on a Proximal Policy Optimization (PPO) algorithm to approximate a policy function and a value function cannot meet the requirements. To this end, the present disclosure constructs a policy network and a value network of a DRL model based on an LSTM architecture. Firstly, an LSTM network is introduced to extract a temporal signal feature from the environment of autonomous driving, output valid perceptual information, and enhance the ability of learning sequence sample data. Secondly, the policy network outputs an evaluated value of a position correction action according to a correction policy output by the current LSTM network, and generates an accurate satellite positioning result. The value network evaluates the correction policy. Finally, the DRL model continuously interacts with the complex environment of autonomous driving. The output value of the policy network keeps approximating an optimal policy $\pi^*_\theta$, and the output value of the value network keeps approximating a real value function $V^*$.

S21. LSTM Network

LSTM network is mainly used in scenes where the input data is sequence data. In the satellite positioning scene under the complex environment of autonomous driving, the data received by the DRL model is temporal. The LSTM network processes the original data to enhance the ability of the learning sequence sample data. It encodes the processed state information into a fixed sequence, and outputs the fixed sequence to the policy network and the value network for training.

Figure 3:
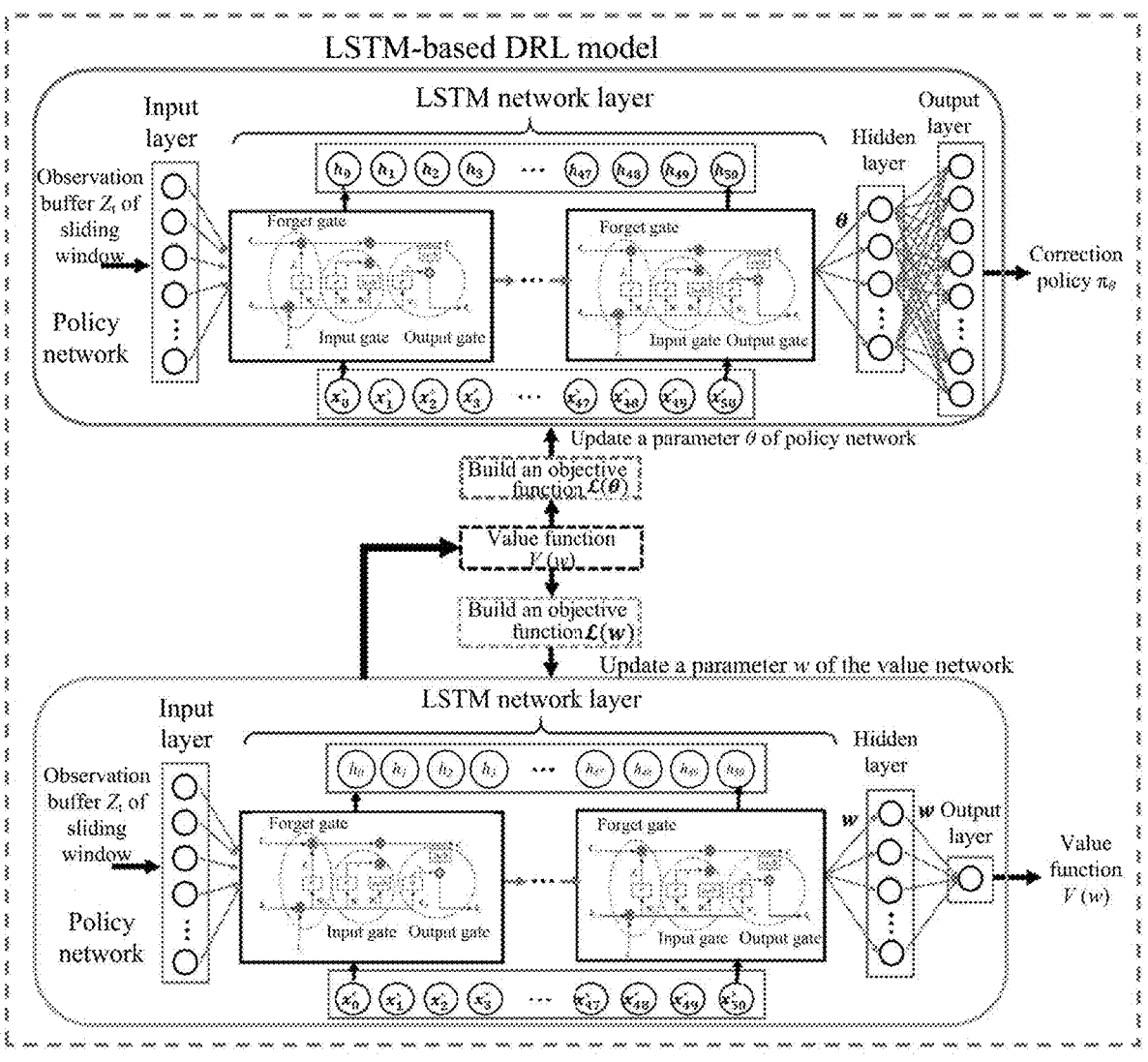
FIG. 3 is a structural diagram of an LSTM-based DRL model according to the present disclosure.

Referring to FIG. 3, firstly, the sequence sample data is normalized, and some invalid information in the sequence sample information is removed by a forget gate of the LSTM network. Secondly, valid information is updated by an input gate. The valid information is output by an output gate and is saved in a hidden state. The processed state information is encoded into a fixed sequence. Finally, the processed sequence is further output to the policy network and value network for training.

Specifically, first of all, in order to reduce an error of the DRL model caused by a large difference in the order of magnitude between the input feature data, it is necessary to normalize the input feature parameters. For the latitude and longitude information of the positioning signal, a conversion function is used to convert the original feature information into information with a value between [0,1]. The conversion function is as follows:

$$x_t^* = \frac{x_t}{\sum_{t=1}^{T} x_t}$$

$x_t$ denotes RTK positioning latitude feature data; $x^*_t$ denotes normalized RTK positioning latitude feature data; and similarly, $y_t$ and $y^*_t$ denote information with values between [0,1] converted by the conversion function.

Secondly, the normalized data is input into the forget gate of the LSTM network, and some invalid information in the sequence sample information is removed. As shown in FIG. 3, the forget gate mainly uses a sigmoid function to determine whether an output $h_{t-1}$ and a cell state $C_{t-1}$ of the network at a previous time continue to exist in a cell state $C_t$ of the network at a current time. A calculation equation of the forget gate is as follows:

$$f_t = \sigma(W_f g[h_{t-1}, x_t] + b_f)$$

$W_f$ denotes a weight matrix; $b_f$ denotes a bias; $x_t$ denotes a current network input; g denotes vector merging; $h_{t-1}$ denotes an input into the forget gate; $f_t$ denotes the forget gate; and $\sigma$ denotes the sigmoid function, which is an activation function.

Thirdly, the input gate updates the valid information acquired by the forget gate. The information output by the sigmoid function is multiplied by the information output by a tanh function to determine how much information of $x_t$ input at the current time will be passed to the cell state $C_t$. The calculation equation of input gate is as follows:

$$i_t = \sigma(W_i g[h_{t-1}, x_1] + b_i) \cdot \tan h(W_c \cdot g[h_{t-1}, x_t] + b_c)$$

$W_i$ and $W_c$ each denote a weight matrix; and $b_i$ and $b_c$ each denote a bias.

Finally, the output gate encodes the processed state information into a fixed sequence and outputs the fixed sequence to the policy network and value network for training. At the output gate, the information output by the sigmoid function is multiplied by the information output by the tanh function to determine how much information in the cell state $C_t$ can be passed to the current output $h_t$. The calculation equation of the output gate is as follows:

$$h_t = \sigma(W_0 \cdot g[h_{t-1}, x_t] + b_0) \cdot \tan h(C_t)$$

$C_t$ denotes the cell state; $h_t$ denotes a current output of the output gate; $W_0$ denotes a weight matrix; and $b_0$ denotes a bias.

S22. LSTM-Based DRL Model

Specifically, the difficulty of the DRL algorithm to solve the accurate satellite positioning in the complex environment of autonomous driving lies in the selection of the step size. In the process of training, if the difference between the new and old policies is too large, it will not be conducive to the learning of the agent, resulting in the slow convergence speed and time delay of the model training, etc. The PPO algorithm continues the step selection mechanism of a confidence region policy optimization algorithm to ensure that its policy keeps rising, that is, the value function is monotonic during the training process. The PPO algorithm solves the above problem well. Therefore, the present disclosure uses the PPO algorithm to create a policy and value-based DRL model, and introduces LSTM network to extract the feature from the complex environment of autonomous driving, so as to ensure that the model has strong decision-making and perception abilities. The LSTM-based DRL model is composed of two Deep Neural Networks (DNNs).

The first DNN is the policy network, which outputs the action policy $\pi_\theta(a|s)$, where $\theta$ denotes a weight parameter matrix of the policy network. The policy network is used to update the action policy of the agent and maximize an expected reward R(s, a) by finding an optimal action policy $\pi_\theta(a|s)$. In the policy network of the DRL model, the number of neurons in the input layer is the same as the dimension of the input state, and the number of neurons in the output layer is the same as the dimension of the correction value. Therefore, for the policy in the current state, that is, the RTK positioning information, the reward is acquired after each action, and the parameter of the policy network is updated through a policy gradient, thus training the policy network.

The policy network mainly includes four layers of neural networks. The first layer is the LSTM network, which includes 50 hidden LSTM memory units. The first layer encodes and outputs the correlation feature of the sequence data acquired by the forget gate and the input gate as an input into the agent. Thus, the agent can consider the temporal positioning data of the environment state when making a decision, and represent the correlation and influence between the normalized kinematic positioning information based on the LSTM network layer, so as to output temporally changing positioning information to the hidden layer and output layer following the first layer. The second and third layers are the hidden layers of a fully connected network. The hidden layers of the fully connected network can abstract the feature of the input data into another dimension space. The number of neurons in the hidden layer has a great influence on the fitting ability of the network. If the number of neurons is insufficient, the fitting ability of the network will be reduced and the expected correction accuracy will not be reached. If the number of neurons is too large, the network will be over-fitted or the training time will be increased. Therefore, according to the positioning accuracy requirements, the number of neurons in the second and third layers is 128 and 64, respectively, and a ReLU function is used as the activation function to facilitate feature extraction. The fourth layer is the output layer of the fully connected network, which includes 441 hidden neuron nodes and outputs the corrected satellite positioning (latitude and longitude) information.

The second DNN is the value network, which outputs the state value V(s, w), where w denotes a weight parameter matrix of the value network. The value network is used to estimate the state value V(s, w) and provide feedback for the policy network. The parameter w of the value network is updated by minimizing a TD error composed of the state value V(s, w) and the reward R(s, a), so as to output a more accurate evaluated value of the correction action for evaluating the positioning correction policy of the policy network.

Because of the similar input features, the structures of the policy network and the value network are almost the same. The value network of the LSTM-based DRL model mainly includes four layers of neural networks. The first layer is the LSTM network layer, which includes 50 hidden LSTM memory units. The first layer extracts the temporal reasoning information from the original sequence data and outputs it to the fully connected layer for further processing. The second and third layers are fully connected layers, with 64 and 32 hidden neuron nodes, respectively. The second and third layers use a ReLU function as the activation function to facilitate feature extraction. The fourth layer is the output layer of the fully connected layer, which includes one output neuron, and is used to evaluate the corrective action of the policy network.

S3. The LSTM-based DRL model is trained in a complex environment of autonomous driving.

Specifically, the training of the LSTM-based DRL model in the complex environment of autonomous driving mainly includes the following processes. The model interacts with a POMDP environment to acquire an observation buffer $Z_t$ of the sliding window. The parameters of the policy network and value network in the model are updated. After the model training, the policy network acquiring the correction action outputs a more accurate positioning result.

First, the model interacts with the complex environment of autonomous driving to acquire the observation buffer $Z_t$ of the sliding window. Because the state information observed by the model at the current time cannot determine the state information of the next time, it does not meet the MDP. Therefore, it is necessary to take the previous prediction information of the agent as the belief state. To this end, the present disclosure introduces the POMDP for environment modeling. The model receives a new RTK positioning observation $e_t$, and the sliding window moves forward one step to form a new observation vector with a constant size N. $e_t$ forms the last element, and N−1 belief states $e_{t-1}$ form the rest of $Z_t$. When the RTK satellite receiver reports a new observation point $e_t$, the DRL model immediately trains and moves to the next observation buffer. That is, at each training step, the input state of the DRL model includes the observation points reported by RTK and a series of historical prediction values.

The framework behaves like a signal filter. The original geographic information defined by latitude and longitude reported by the RTK satellite receiver and the predicted position information of the DRL model are taken as the input state. The policy network of the DRL model selects a small or large correction action for the input state according to the existing policy. The output geographic information defined by latitude and longitude and the previous RTK positioning observation together constitute the observation buffer $Z_t$ of the sliding window.

Secondly, the policy network and value network in the model update the parameters through the data of the observation buffer $Z_t$ of the sliding window. The goal of the value network is to minimize the TD error so as to update the parameter w of the value network. The output value continuously approximates the real value function V*, and the new RTK positioning observation $e_t$ is input into the value network. According to the TD algorithm, the TD error is expressed as follows:

$$\delta = r_t + \gamma V(e_{t+1}, w) - V(e_t, w)$$

$\gamma$ denotes a discount rate; $e_t$ denotes a belief state at the time t; and $r_t$ denotes a reward at the time t.

By minimizing the expectation of TD error, an objective function of the value network is acquired:

$$\min_w \mathcal{L}(w) = \min_w \mathbb{E}\left[(r_t + \gamma V(e_{t+1}, w) - V(e_t, w))^2\right]$$

$\mathbb{E}(\bullet)$ denotes an expectation function.

For the policy network, according to the input data of the observation buffer $Z_t$ of the sliding window and an advantage function $\hat{H}_t$ calculated by the value network, the policy $\pi_\theta$ is updated every t steps. The goal of the policy network is to update the parameter $\theta$ of the policy network through a policy gradient ascent method, such that the output value continuously approximates the optimal policy $\pi^*_\theta$. Through the advantage function $\hat{H}_t$, an objective function of the policy network is formed below:

$$\max_\theta \mathcal{L}(\theta) = \max_\theta \mathbb{E}[\min(\hat{H}_t, \text{clip}(\rho_t(\theta), 1 - \epsilon, 1 + \epsilon)\hat{H}_t)]$$

$\hat{H}_t$ denotes the advantage function, which can be replaced by the TD error. $\epsilon$ denotes a hyper-parameter, which needs to be adjusted manually. clip($\bullet$) denotes a clipping function, which modifies the objective function of the policy network clipping a probability ratio, thus eliminating a part of $\rho_t(\theta)$ outside [1−$\epsilon$, 1+$\epsilon$]. $\rho_t(\theta)$ denotes the probability ratio between the new and old policy networks, which is expressed as follows:

$$\rho_t(\theta) = \frac{\pi_\theta(a_t | e_t)}{\pi_{\theta_{old}}(a_t | e_t)}$$

Because the objective functions of the value network and the policy network are smooth convex functions, a random gradient algorithm is directly used to update the weight parameters of the value network and the policy network. The weight parameter matrices w of the value network are iteratively updated by a random gradient descent method, and the weight parameter matrices $\theta$ of the policy network are updated iteratively by a random gradient ascent method. The update equations are as follows:

$$w^{(k+1)} \leftarrow w^{(k)} - \alpha \nabla \mathcal{L}^T(w)$$

$$\theta^{(k+1)} \leftarrow \theta^{(k)} + \beta \nabla \mathcal{L}^T(\theta)$$

$\alpha > 0$ denotes a learning rate of the value network, and $\beta > 0$ denotes a learning rate of the policy network.

Finally, the model continuously interacts with the complex environment of autonomous driving to acquire the optimal policy for maximizing the long-term reward. In other words, the policy network of the DRL model processes the input feature signal, outputs the evaluated value of the position correction action, and generates a more accurate satellite positioning position, thus solving the dynamic interference problem caused by environmental changes in the autonomous driving scene.

Figure 5:
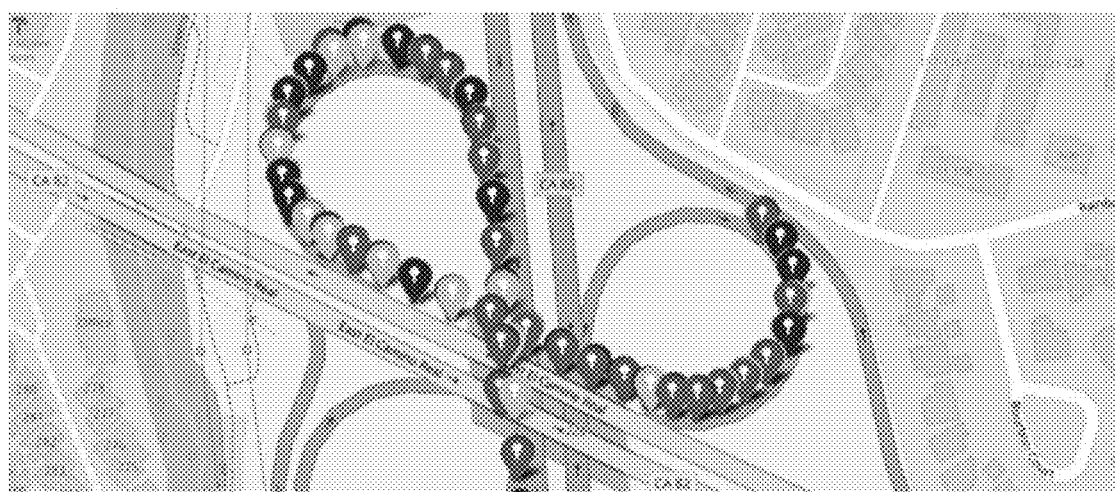
FIG. 5 is a schematic diagram of a positioning result of the LSTM-based DRL model on a real road according to the present disclosure.

Referring to FIG. 5, the initial RTK positioning result is input into the LSTM-based DRL model for correction, and the corrected position information is output to a real road in turn according to the temporal sequence.

Figure 2:
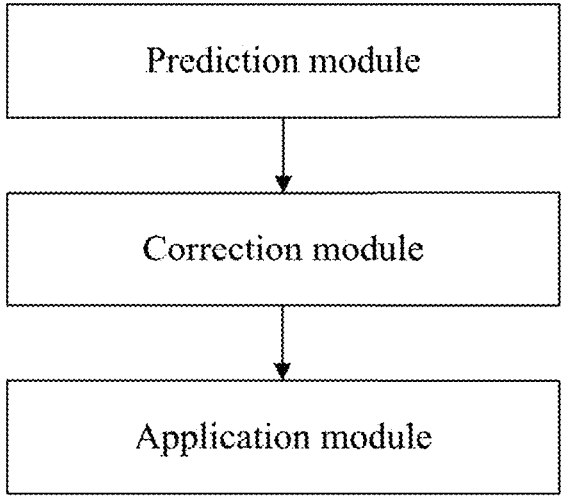
FIG. 2 is a block diagram of a positioning system for autonomous driving through LSTM-based DRL according to the present disclosure.

Referring to FIG. 2, the present disclosure provides a positioning system for autonomous driving through LSTM-based DRL. The system includes: a prediction module, a correction module, and an application module.

The prediction module is configured to perform normalization preprocessing on a complex environment of autonomous driving based on POMDP, to acquire an RTK positioning result.

The correction module is configured to input the RTK positioning result into an LSTM-based DRL model for correction to acquire an evaluated value of a position correction action.

The application module is configured to perform position correction on an autonomous vehicle based on the evaluated value of the position correction action.

To sum up, referring to FIG. 5, the present disclosure is based on DRL to correct the error generated by dynamic observation noise in autonomous driving positioning, so as to improve the positioning accuracy. First of all, the present disclosure constructs the interactive environment for accurate satellite positioning in the complex environment of autonomous driving, and constructs the LSTM-based DRL model. The state information observed by the agent at the current time cannot determine the state information at the next time, so it cannot meet the MDP. Therefore, the present disclosure introduces the POMDP for environment modeling. The present disclosure takes the previous prediction information of the agent as the belief state, and allows the next state to be determined by the temporal signal of the belief state at the previous time. Thus, the present disclosure constructs the LSTM-based DRL model, which involves the structural design and parameter selection of the policy network and the value network. The LSTM-based DRL model is trained in the complex environment of autonomous driving, which includes the interaction process between the agent and the environment, and the parameter update process of the policy network and the value network. In this way, the present disclosure forms a correction action policy controller to implement the correction action and thus outputs a more accurate positioning result. Finally, the present disclosure applies the training model to a real complex environment of autonomous driving. The present disclosure inputs the real initial result of RTK positioning for correction, and outputs the corrected position information to the real road in turn according to the temporal sequence.

The content in the embodiment of the method is applicable to the embodiment of the system. The specific function of the embodiment of the system is the same as that of the embodiment of the method, and the beneficial effect of the embodiment of the system is the same as that of the embodiment of the method.

The above merely describes specific embodiments of the present disclosure, but the present disclosure is not limited thereto. A person skilled in the art can make modifications or replacements without departing from the spirit of the present disclosure, and these modifications or replacements shall fall within the protection scope of the claims of the present disclosure.

What is claimed is:

1. A positioning method for autonomous driving through long short-term memory (LSTM)-based deep reinforcement learning (DRL), comprising:

performing normalization preprocessing on a complex environment of autonomous driving based on a Partially Observable Markov Decision Process (POMDP), to acquire a real-time kinematic (RTK) positioning result;

constructing an LSTM-based DRL model, wherein the LSTM-based DRL model comprises a policy network and a value network, and the policy network comprises an input layer, an LSTM network layer, a hidden layer, and a output layer;

training the LSTM-based DRL model in the complex environment of a autonomous driving, comprising:

modeling the complex environment of autonomous driving based on the POMDP to acquire a POMDP environment;

interacting the LSTM-based DRL model with the POMDP environment to acquire an observation buffer of a sliding window, and iteratively updating parameters of the policy network and the value network by the observation buffer of e sliding window;

inputting the RTK positioning result into the LSTM-based DRL model for correction to acquire an evaluated value of a position correction action; and sequentially outputting, by the LSTM-based DRL model, corrected position information to a real road in the complex environment of autonomous driving based on the evaluated value of the position correction action.

2. The positioning method for autonomous driving through LSTM-based DRL according to claim 1, wherein performing normalization preprocessing on the complex environment of autonomous driving based on the POMDP, to acquire the RTK positioning result comprises:

acquiring, by an RTK positioning technology, complex environment information of autonomous driving and agent positioning information;

modeling the complex environment of autonomous driving based on the POMDP to acquire an environment model;

representing, by the environment model, the complex environment information of autonomous driving and the agent positioning information to acquire a corresponding belief state distribution;

solving, by a POMDP programming method, the corresponding belief state distribution to acquire the RTK positioning result.

3. The positioning method for autonomous driving through LSTM-based DRL according to claim 2, wherein solving, by the POMDP programming method, the corresponding belief state distribution to acquire the RTK positioning result comprises:

defining, by the POMDP programming method, an action space, an observation state space, a belief state space, and a reward function;

correcting, by the action space, the agent positioning information to acquire corrected agent positioning information;

predicting, by the observation state space, the agent positioning information to acquire predicted agent positioning information;

replacing, by the belief state space, the agent positioning information with the predicted agent positioning information, and updating the belief state space; and negating, by the reward function, a sum of a square error of a difference between the corrected agent positioning information and the predicted agent positioning information to acquire the RTK positioning result.

4. The positioning method for autonomous driving through LSTM-based DRL according to claim 3, wherein a calculation equation for negating, by the reward function, the sum of the square error of the difference between the corrected agent positioning information and the predicted agent positioning information is as follows:

$$R_t = r_1 + \eta \sum_{t=2}^{T} \gamma^{t-1} r_t$$

$$r_t = -\sqrt{(x_t - \tilde{x}_t)^2 + (y_t - \tilde{y}_t)^2}$$

wherein, $\eta$ denotes a reward regularization factor; $r_t$ denotes a negative of a Euclidean distance between corrected position information $(x_t, y_t)$ of the LSTM-based DRL model and map matching position information $(\tilde{x}_t, \tilde{y}_t)$ at a time t; $\gamma^{-1}$ denotes a reward discount factor; and $R_t$ denotes a cumulative reward at the time t.

5. The positioning method for autonomous driving through LSTM-based DRL according to claim 4, wherein inputting the RTK positioning result into the LSTM-based DRL model for correction to acquire the evaluated value of the position correction action comprises:

correcting, by the policy network, the input RTK positioning result according to a preset action magnitude, and outputting a positioning observation result comprising geographic position information defined by latitude and longitude; and optimizing, by the value network, the positioning observation result comprising the geographic position information defined by latitude and longitude by minimizing a Temporal Difference (TD) error, to acquire the evaluated value of the position correction action for evaluating a positioning correction policy of the policy network.

6. The positioning method for autonomous driving through LSTM-based DRL according to claim 5, wherein correcting, by the policy network, the input RTK positioning result according to the preset action magnitude, and outputting the positioning observation result comprising the geographic position information defined by latitude and longitude comprises:

inputting the RTK positioning result into the policy network;

normalizing, by the input layer, the RTK positioning result to acquire normalized positioning information;

representing, by the LSTM network layer, a correlation and influence between the normalized kinematic positioning information, and outputting temporally changing positioning information to the hidden layer and output layer following the LSTM network layer; and multiplying, by the hidden layer and the output layer, represented positioning information through a sigmoid function and a tanh function, and outputting the positioning observation result comprising the geographic position information defined by latitude and longitude.

7. The positioning method for autonomous driving through LSTM-based DRL according to claim 6, wherein representing, by the LSTM network layer, the correlation and influence between the normalized kinematic positioning information, and outputting the temporally changing positioning information to the hidden layer and output layer following the LSTM network layer comprises:

inputting the normalized positioning information into the LSTM network layer, comprising an input gate, a forget gate, and an output gate;

updating, by the input gate, the normalized positioning information to acquire updated positioning information;

removing, by the forget gate, invalid positioning information in the updated positioning information, to acquire valid positioning information; and sequencing, by the output gate, the valid positioning information to acquire the represented positioning information.

8. The positioning method for autonomous driving through LSTM-based DRL according to claim 7, wherein a calculation equation of the forget gate is as follows:

$$f_t = \sigma(W_f g[h_{t-1}, x_t] + b_f)$$

wherein, $W_f$ denotes a weight matrix; $b_f$ denotes a bias; $x_t$ denotes a current network input; g denotes vector merging; $h_{t-1}$ denotes an input into the forget gate; $f_t$ denotes the forget gate; and $\sigma$ denotes the sigmoid function, which is an activation function.

9. The positioning method for autonomous driving through LSTM-based DRL according to claim 8, wherein a calculation equation for minimizing the TD error is expressed as follows:

$$\delta = r_t + \gamma V(e_{t+1}, w) - V(e_t, w)$$

wherein, $\gamma$ denotes a discount rate; $e_t$ denotes a belief state at the time t; $r_t$ denotes a reward at the time t; V denotes a value function; w denotes a parameter of the value network; and $\delta$ denotes the TD error.

\*      \*      \*      \*      \*